United States Patent
Nguyen et al.

(10) Patent No.: US 10,925,219 B2
(45) Date of Patent: Feb. 23, 2021

(54) CLIMATE CONTROL SYSTEM AND METHOD FOR INDOOR HORTICULTURE

(71) Applicant: GS Thermal Solutions Inc., Danbury, CT (US)

(72) Inventors: Ken Nguyen, Danbury, CT (US); Ming Zhang, Weston, CT (US)

(73) Assignee: GS THERMAL SOLUTIONS INC., Danbury, CT (US)

( * ) Notice: Subject to any disclaimer, the term of this patent is extended or adjusted under 35 U.S.C. 154(b) by 0 days.

(21) Appl. No.: 16/157,067

(22) Filed: Oct. 10, 2018

(65) Prior Publication Data

US 2019/0141911 A1 May 16, 2019

Related U.S. Application Data

(60) Provisional application No. 62/570,936, filed on Oct. 11, 2017.

(51) Int. Cl.
| | |
|---|---|
| *A01G 9/20* | (2006.01) |
| *A01G 9/24* | (2006.01) |
| *A01G 7/04* | (2006.01) |
| *F21V 29/50* | (2015.01) |
| *F21V 33/00* | (2006.01) |
| *F21V 29/58* | (2015.01) |
| *F21W 131/40* | (2006.01) |

(52) U.S. Cl.
CPC ............. *A01G 9/246* (2013.01); *A01G 7/045* (2013.01); *A01G 9/20* (2013.01); *F21V 29/50* (2015.01); *F21V 29/59* (2015.01); *F21V 33/0092* (2013.01); *F21W 2131/40* (2013.01)

(58) Field of Classification Search
CPC .. F24F 3/14; F24F 3/153; A01G 9/246; F21V 29/56–59
See application file for complete search history.

(56) References Cited

U.S. PATENT DOCUMENTS

| | | | |
|---|---|---|---|
| 3,869,605 A * | 3/1975 | Davis | A01C 1/02 362/264 |
| 2010/0257878 A1* | 10/2010 | Arbel | A01G 9/246 62/93 |
| 2012/0096883 A1* | 4/2012 | Tavsan | A01G 9/246 62/185 |
| 2013/0003382 A1* | 1/2013 | Ohura | A01G 9/26 362/253 |
| 2017/0241632 A1* | 8/2017 | Nguyen | F21V 29/59 |

FOREIGN PATENT DOCUMENTS

| | | | | |
|---|---|---|---|---|
| DE | 202014105523 U1 * | 2/2016 | | H05B 33/0872 |
| GB | 1200924 A * | 8/1970 | | F24F 3/04 |

* cited by examiner

*Primary Examiner* — Eric S Ruppert
(74) *Attorney, Agent, or Firm* — Edward Kelley; Ahmed Imtiaz Billah

(57) ABSTRACT

An air heating cooling and dehumidification device for maintaining room air at a desired humidity and temperature includes an air to air cross flow heat exchanger (105) formed with cross flow first and second air flow paths (A) and (B), a primary air to liquid heat exchanger (110) in fluid communication with a liquid cooling fluid source (150) for dehumidifying air flow and a secondary air to liquid heat exchanger (115) for reheating the air flow after dehumidification.

18 Claims, 3 Drawing Sheets

CLIMATE CONTROL SYSTEM AND METHOD FOR INDOOR HORTICULTURE

1 CROSS REFERENCE TO RELATED U.S. PATENT APPLICATIONS

The present application claims priority under 55 U.S.C. § 119(e) to provisional U.S. Patent Application Ser. No. 62/570,936 filed 11 Oct. 2017, entitled High Efficiency Heating, Cooling, and Dehumidification Unit for Indoor Horticulture, which is incorporated herein by reference in its entirety and for all purposes.

2 COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright GS Thermal LLC.

3 BACKGROUND OF THE INVENTION

3.1 Field of the Invention

The exemplary, illustrative, technology herein relates to systems, software, and methods for climate control for an indoor horticultural environment.

The technology herein has applications in the areas of climate control in a high humidity indoor environment wherein waste heat is available from an artificial lighting cooling system.

3.2 The Related Art

Indoor horticultural environments have different climate control needs as compared to conventional indoor climate control systems for a human environment, e.g. home or office spaces. A typical climate control system for use in an indoor horticultural environment is configured to maintain air temperature levels, air humidity levels and in some cases carbine dioxide levels suited for plant growth as opposed to human comfort and the plant growth environment can be more complex and, in many cases, requires additional energy use and compared to climate control systems designed for human comfort.

In an example, moisture, e.g. liquid water or atomized water that is frequently added to indoor plant growth environment due to plants photosynthesis process when plants uptake liquid and nutrient from the root by transpiration and give off water vapor through pores in the plant leaves. The process of feeding, by liquid nutrient flow, for hydroponics also tends to increase air humidity levels. The increased humidity levels correspond with a need to provide additional dehumidification capacity. To remove more moisture from the air, the dehumidification equipment drops the temperature of the humid room air below dew point temperature which caused the dehumidification equipment to expend more energy. Concurrently, when the room air temperature is dropped below the dew point temperature to remove moisture, the below dew point room air temperature is often too low to return to the cooler air to growth environment so the cooler air exiting the dehumidifier is heated to increase the room air temperature after dehumidification. Accordingly, a heating system is required to reheat the room air to the desired room air temperature suitable for plant growth, and the heating system expends additional energy. This problem is common in indoor horticultural environments that use artificial lighting but is also common in greenhouse horticultural environments that utilize natural lighting.

For indoor horticultural environments that utilize artificial lighting systems to illuminate the plants the illumination level required for plant growth tend to be significantly higher than illumination levels used by humans in a typical home or office environment. For green house horticultural environments solar illumination levels also tend to be higher than illumination levels used by humans in a typical home or office environment. In both cases, thermal energy is added to the growth environment, either by solar heating in the green house or by waste heat emitted by artificial lighting systems. While the added thermal energy can be beneficial, e.g. in winter when solar heating or waste heat emitted by artificial lighting systems can decrease the heating load required to maintain the horticultural environment at desired growth temperatures, the same solar heating or waste heat emitted by artificial lighting systems can increase the cooling load required to maintain the horticultural environment at the desired growth temperatures in summer or in warmer climates. As a result, more robust and versatile climate control systems are required in horticultural environments.

A consequence of added thermal energy from illumination increases dehumidification loads in horticultural environments. The increased air temperature can increase the humidity and/or the volume of liquid water that must condensed from the air by the dehumidification system. The dehumidification system uses a coolant to drop the air temperature below the due point temperature to initiate condensation of liquid water from the air, and this requires a first workload associated with cooling the coolant and cooling the air to a temperature that is below the dew point temperature. However, air cooled below the dew point temperature is typically too cold to be returned to the horticultural environment, so an additional heating system is added to reheat the air after dehumidification and this tends to increase the overall heating load required to maintain the horticultural environment at a desired growth temperature.

The present invention provides an integrated heating cooling and dehumidification device configured to meet higher demands of horticultural environments. Additionally, a climate control system of the present invention provides control elements and configurations operable to change climate control systems configurations to address temporally varying climate control requirements and to utilize waste heat to reduce energy costs when the waste heat is available.

4 SUMMARY OF THE INVENTION

In view of the problems associated with conventional climate control systems, methods and apparatus set forth above it is an object of the present invention to provide an improved heating, cooling, and dehumidification device configured for indoor horticulture, whether equipped with artificial lighting or configured as a greenhouse with solar lighting.

The present invention includes an air heating cooling and dehumidification device for maintaining room air at a desired humidity and temperature. The device includes an air to air cross flow heat exchanger (105) formed with a first air flow path (A) for receiving room air flow therein. A primary air to liquid heat exchanger (110) includes a primary cooling coil (145) in fluid communication with a liquid cooling fluid source (150). Room air flow is directed from the first air flow path (A) through the primary air to liquid heat exchanger (110).

A second air flow path (B) formed by the air to air cross flow heat exchanger (105). The air flow passing through the first flow path (A) and the air flow passing through the second flow path (B) are not mixed while passing through the cross-flow heat exchanger however, thermal energy is exchanged between air flowing through the first flow path (A) and air flowing through the second flow path (B). The room air flow exiting from the primary air to liquid heat exchanger (110) is directed through the second air flow path (B).

A secondary air to liquid heat exchanger (115) comprising a secondary heating coil (165) is in fluid communication with a liquid heating fluid source (170). The room air flow exiting from the second flow path (B) is directed through the secondary air to liquid heat exchanger (115) wherein it is heated to a desired exit temperature.

5 BRIEF DESCRIPTION OF THE DRAWINGS

The features of the present invention will best be understood from a detailed description of the invention and example embodiments thereof selected for the purposes of illustration and shown in the accompanying drawings in which.

6 DESCRIPTION OF SOME EMBODIMENTS OF THE INVENTION

6.1 Overview

Figure 1:
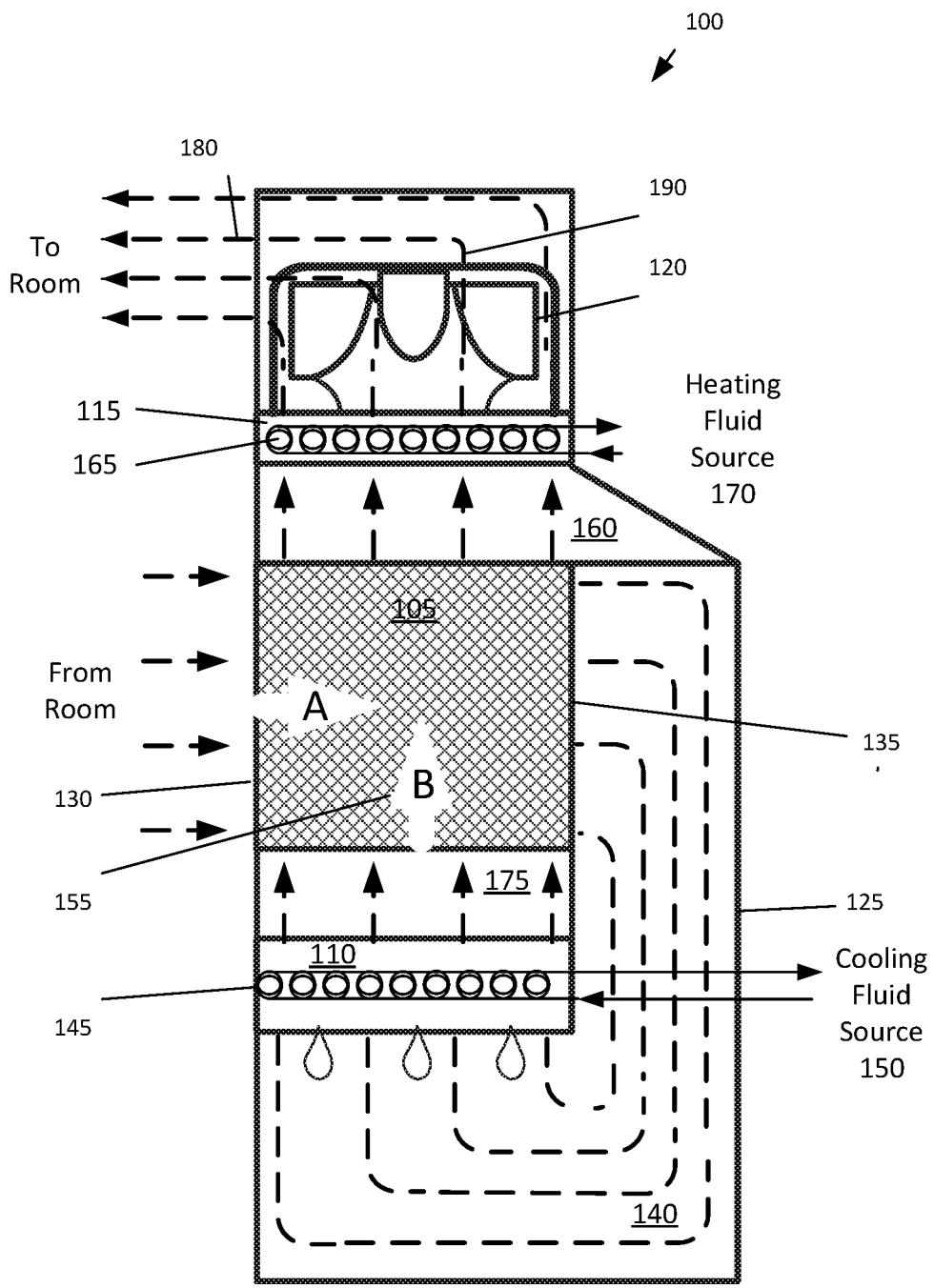
FIG. 1 depicts an exemplary non-limiting schematic side view diagram of an improved heating, cooling, and dehumidification device according to an aspect of the present invention.

The present invention comprises an improved heating, cooling, and dehumidification (HCI) device (100) configured for an indoor horticultural environment. The HCI device (100) includes a cross flow air to air heat exchanger (105). The cross-flow air to air heat exchanger includes a first intake air channel (A). An air moving device (120) is operated to expel air out from an output side of the HCl (100), which causes room air to be drawn into the first intake channel (A). The HCD device includes a primary air to liquid heat exchanger (110) interfaced with a cooling fluid source (150). The cooling fluid source (150) comprises a conventional liquid chiller based on a conventional vapor pressure or absorption refrigeration cycle. Other chiller options, e.g. a natural cold-water source, or the like, are usable without deviating from the present invention. The primary liquid to liquid heat exchanger (110) operates to cool the incoming air received from the first intake channel (A). The incoming air is cooled to temperature that is sufficiently below the dew point temperature of the incoming air to reduce the humidity of the incoming air flow to a desired humidity level. After dehumidification, a cooler air flow exits from the primary liquid to liquid heat exchanger (110) and is directed through a second air channel (B), which passes through the cross-flow air to air heat exchanger (105) in a manner that places the cooler air in the second air channel (B) in thermal communication with the warmer incoming air in the first intake channel (A). After exiting the second air channel (B) the HCD (100) is configured to direct the air flow into a secondary air to liquid heat exchanger (115) included in the HOD device.

Thus, cooler air flow passing through the second air channel (B) pre-cools the warmer incoming air flow entering the first air channel (A) prior to the air flow of the first air channel (A) entering the primary air to liquid heat exchanger (110). This first precooling step of the incoming air passing through the intake channel (A) provides a first reduction in energy consumption required to dehumidify the incoming air because the temperature of the incoming air is already lowered by interaction with the cooler air flow through the second air channel (B). Simultaneously, the same interaction between the cooler air flow in the second air channel (B) with the warmer incoming air flow passing through the first intake air channel (A) heats the cooler air flow in the second air channel (B) prior to the cooler air flow in the second air channel (B) entering the secondary heat exchanger (115) for heating. This second pass of the air through the air to air heat exchanger (105) provides a second reduction in energy consumption required to further heat the air flow passing through the second air channel (B) because the temperature of the air in the second air channel (B) is already increased by interaction with the warmer air flow through the first air channel (A).

The secondary air to liquid heat exchanger (115) is interfaced with a heating fluid source (170). The heating fluid source (170) comprises a conventional liquid heater such as a boiler, or the like to heat a liquid, e.g. water to a desired temperature. However, other liquid heater options, e.g. a liquid cooling fluid that has been heated by thermal contact with a lighting assembly (325) operated in the horticultural environment, or a natural hot water source, or the like, or a combination of several heated fluid sources is usable without deviating from the present invention. The secondary air to liquid heat exchanger (115) operates to heat the air received from the second air channel (B). The incoming air is heated to a desired air exit temperature before being expelled from the HCD (100) by the air moving device (120).

The system of the present invention further includes a climate control system (200). The fluid control system includes a plurality of liquid and gas fluid conduits configured to direct liquid and gas fluids to various devices for heating and cooling as required. The fluid control system includes an electronic controller (205) interfaced with a plurality of temperature, humidity and other sensors provided to monitor fluid control parameters and a plurality of fluid flow control devices operable by the electronic controller to open and close fluid conduits and to vary flow rates in the fluid conduits as required.

This and other aspects and advantages of the present invention will become apparent when the Description below is read in conjunction with the accompanying Drawings.

6.2 Definitions

The following definitions are used throughout, unless specifically indicated otherwise:

| TERM | DEFINITION |
|---|---|
| Dew Point Temperature | The dew point is the temperature to which air must be cooled to become saturated with water vapor. When further cooled, the airborne water vapor will condense to form liquid water (dew). The measurement of the dew point is related to humidity. A higher dew point means there will be more moisture in the air. |

6.3 Item Number List

The following item numbers are used throughout, unless specifically indicated otherwise.

| # | DESCRIPTION |
|---|---|
| 100 | Heating, cooling, and dehumidification Unit HCD |
| 105 | Air to air heat exchanger |
| A | $1^{st}$ Air flow path |
| B | $2^{nd}$ air flow path |
| 110 | Primary liquid to air heat exchanger |
| 115 | Secondary liquid to air heat exchanger |
| 120 | Air moving device |
| 125 | Enclosure |
| 130 | Air intake aperture |
| 135 | Air output side |
| 140 | $1^{st}$ Air flow chamber |
| 145 | Primary cooling coil |
| 150 | Cooling fluid source |
| 155 | $2^{nd}$ Air intake side |
| 160 | 3rd Air flow chamber |
| 165 | Secondary heating coil |
| 170 | Heating fluid source |
| 175 | $2^{nd}$ Air flow chamber |
| 180 | Exit aperture |
| 190 | $4^{th}$ Air flow chamber |
| 200 | Climate control system |
| 205 | Electronic controller |
| 210 | Temperature sensor |
| 215 | Humidity sensor |
| 220 | Fluid flow rate sensor |
| 225 | Liquid cooling circuit |
| 230 | Cold input conduit |
| 235 | Warm return fluid conduit |
| 240 | $1^{st}$ Fluid pump |
| 245 | $1^{st}$ Control valve |
| 250 | Liquid heating circuit |
| 255 | Hot input conduit |
| 260 | Cool return conduit |
| 265 | $2^{nd}$ Fluid pump |
| 270 | $2^{nd}$ Control valve |
| 275 | $1^{st}$ three-way valve |
| 280 | $2^{nd}$ three-way valve |
| 285 | $1^{st}$ auxiliary conduit |
| 290 | $2^{nd}$ auxiliary conduit |
| 300 | Indoor horticultural environment |
| 305 | Horticultural products |
| 310 | Roof |
| 315 | Side walls |
| 320 | Lighting assembly |
| 325 | Lighting cooling module |
| 330 | Lighting assembly cooling circuit |
| 335 | Auxiliary heating fluid source |
| 340 | Auxiliary air to liquid heat exchanger |
| 345 | Air moving device |
| 350 | Liquid cooling circuit |
| 355 | |

6.4 Exemplary System Architecture

The present invention includes a High Efficiency Heating, Cooling, and Dehumidification Unit (HCD) (100) suitable for Indoor Horticulture with artificial lighting or in a greenhouse environment with solar lighting. The HCD (100) comprises an air to air heat exchanger (105), a primary air to liquid heat exchanger (110), a secondary air to liquid heat exchanger (115) and an air moving device (120), each housed in an enclosure (125), as shown in FIG. 1.

The air to aft heat exchanger (105) is configured to include two separate aft flow paths including a first air flow path (A) for drawing room aft therein through an aft intake aperture (130) formed by the first aft flow path (A). As shown in FIG. 1, the first flow path (A) extends to an output side (135). The aft flow exiting from the output side (135) is received into a first flow chamber (140), formed by the enclosure (125). The first air flow chamber (140) is configured redirect the aft flow received therein to an input side of the primary air to liquid heat exchanger (110). A primary cooling coil (145) is disposed inside the primary air to liquid heat exchanger (110). The primary cooling coil (145) comprises a fluid conduit in fluid communication with a cooling fluid source (150). A cooling fluid is caused to circulate between the cooling fluid source (150) and the primary cooling coil (145) by a fluid pump or other fluid moving apparatus, Preferably the primary cooling coil (145) is configured to provide enough exterior surface area in contact with the aft flow passing through the primary air to liquid heat exchanger (110) to sufficiently cool the aft flow to a temperature that is consistent with condensing liquid from the aft flow to achieve a desired aft humidity level.

Upon exiting the primary air to liquid heat exchanger (110) the air flow reenters a second air flow chamber (175) formed by the enclosure (125). The second air flow chamber (175) is configure to direct air flow from the primary heat exchanger (110) to a second air flow path (B) of the air to air heat exchanger (105). The second air flow path (B) passes through the air to air heat exchanger (105) along a substantially orthogonal path as compared with the first air flow path (A). The first air flow path (A) and the second air flow path (B) are formed as a cross-flow heat exchanger wherein air flowing through the first flow path (A) is not mixed with air flowing through the second flow path (B), however the air paths (A) and (B) are separated by a thermally conductive wall e.g. formed from materials having a high coefficient of thermal conductivity e.g. greater than 100 Wm/K and up to 500 Wm/K which includes aluminum, copper, zinc, or the like. Specifically, the air to air heat exchanger (105) is configured to provide thermal communication between the first and second air flow paths (A) and (B) so that thermal energy is readily transferred between the air flow passing through the first air the first and second flow paths (A) and (B). In the present example, the cross-flow air to air heat exchanger (105) precools the room air drawn into the air intake side (130) and passing through the first air flow path (A) before the air flow having exited the first air flow path (A) is further cooled by the primary cooling coil (145).

The second air flow path (B) directs the aft flow to a third aft flow chamber (160) which is formed by the enclosure (125). The third air flow chamber (160) receives aft flow exiting from the second air flow path (B) and redirects the aft flow into the secondary air to liquid exchanger (115). A secondary heating coil (165) is disposed inside the secondary air to liquid heat exchanger (115). The secondary heating coil (165) comprises a fluid conduit in fluid communication with a heating fluid source (170). A heating fluid is caused to circulate between the heating fluid source (170) and the secondary heating coil (165) by a fluid pump or other fluid moving apparatus. Preferably the secondary heating coil (155) is configured to provide enough exterior surface area in contact with the air flow passing through the secondary liquid to air heat exchanger (115) to sufficiently heat the air flow to a desired aft temperature at the exit of the secondary air to liquid heat exchanger (115). The air moving device (120) such as a rotary fan, is supported by the enclosure (125) proximate to an aft exit aperture (180). In an embodiment, the aft moving device (120) is operated to force aft flow through the exit aperture (180) which causes air flow to be drawn into the enclosure (125) through the intake aperture (135). In other embodiments the position of the air moving device (120) between the intake aperture and the exit aperture can be changed without deviating from the present invention.

Thus, according to an aspect of the present invention, the air flow passing from the room through the first flow path (A) to the first air flow chamber (140) is pre-cooled by proximity to the cooler air passing through the flow path (B) after having been cooled by the primary cooling coil (145). After passing through the first air flow chamber, the air flow is cooled further as it passes through the primary air to liquid heat exchanger (110) by proximity with the primary cooling coil (145) Preferable, the aft flow is sufficiently cooled by the primary air to liquid heat exchanger (110) to condense enough liquid water out of the aft flow to achieve a desired aft flow humidity.

Upon the second pass through the air to air heat exchanger (105) along the second flow path (B) the air flow is pre-heated by proximity with the warmer air flowing through the flow path (A). After exiting the second flow path (B) and finally passing through the secondary air to liquid heat exchanger (115) the air flow is further heated by proximity with the secondary heating coil (165) before being discharged back to the room through the exit aperture (180).

The air flow, heating and cooling process as well as the structural configuration of the enclosure and heat exchange elements as detailed above and depicted schematically in FIG. 1 reduces energy consumption and reduces space requirements for indoor horticultural climate control equipment by providing heating, cooling and dehumidification in a single unit (100) instead of conventional climate control that can be split into two or three different units each having separate controls and interfaces. In addition, as will be described below, the single unit design can be more readily and automatically reconfigured to utilize waste heat, when it becomes available, either alone or in combination with another heating source to provide air heating with reduced energy cost.

In an example, the cooling fluid source (150) may comprise any liquid cooling source that provides a cooling fluid at a cooling fluid temperature suitable for dehumidification. In an example embodiment, the cooling fluid temperature ranges between 40 and 60° F. (4.4 and 15.5° C.). The cooling fluid source (150) may provide a constant cooling fluid temperature, e.g. 40° F. or 4.4° C. or the temperature of the cooling fluid can be varied by the climate control system. A mass or volume flow rate of the cooling fluid is also variable by operating of a flow rate modulating valve or the like that can be actuated by an electronic controller to incrementally vary a flow rate of the cooling fluid to the primary cooling coil (145). In an exemplary embodiment a temperature of the cooling fluid, and/or a volume or mass flow rate of the cooling fluid passing through the primary cooling coil (145), is autonomously controlled by a system controller to modify a cooling rate of the primary air to liquid heat exchanger (110), Additionally, a volume or mass flow rate of aft moving over the primary cooling coil (145) is also controllable by a system controller which is operable to vary an operating parameter of the aft moving device (120) to vary the air flow rate through the HCD unit (100).

Figure 2:
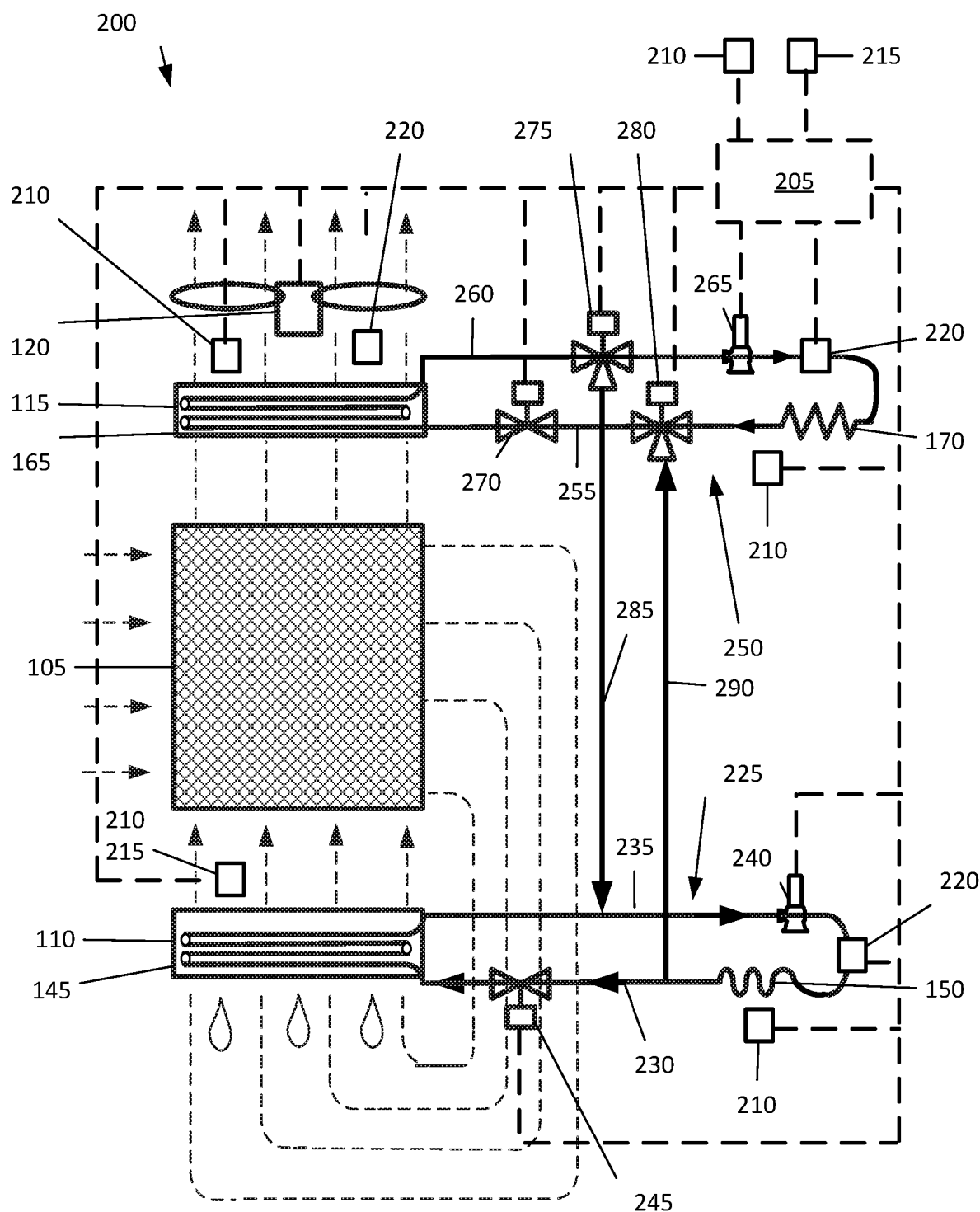
FIG. 2 depicts an exemplary non-limiting schematic diagram showing a fluid distribution and climate control system according to an aspect of the present invention.

FIG. 2 schematically depicts a climate control system (200) according to an aspect of the present invention. The climate control system includes an electronic controller (205) that Includes a data processor and associated memory module operating a climate control schema. The climate control system (200) includes one or more temperature sensors (210), one or more humidity sensors (215), and one or more fluid flow rate sensors (220), appropriately positioned to monitor temperature and humidity conditions at selected locations of the horticultural environment, to monitor outside air temperature and humidity and to monitor temperature and/or humidity at selected locations inside the HCD unit (100). In an embodiment, gas and/or liquid volume or mass flow rate, sensors are appropriately positioned to monitor gas and liquid flow rates e.g. an air flow rate through the enclosure (125) or liquid flow rated through either of the air to liquid heat exchangers (110) and (115).

Each of the temperature, (210), humidity (215) and fluid flow rate sensors (220) is electrically interfaced with the electronic controller (205). Each temperature or humidity sensor (210) (215) generates a temperature of humidity sensor signal that is interpretable by the climate control schema to determine an instantaneous air temperature and humidity at each temperature or humidity sensor location. Each flow rate sensor generates a flow rate sensor signal that is interpretable by the climate control schema to determine an instantaneous gas or liquid flow rate at each fluid flow rate sensor (220) location.

The climate control system (200) includes the elements of the High Efficiency Heating, Cooling, and Dehumidification Unit (HCD) (100) shown schematically in FIG. 1. The same reference numbers used in FIG. 1 are used in FIG. 2 to refer to like features including the aft to air heat exchanger (105), the primary air to liquid heat exchanger (110), the secondary air to liquid heat exchanger (115), the aft moving device (120), the cooling fluid source (150) and the heating fluid source (170).

A liquid cooling circuit (225) includes the primary cooling coil (145) of the primary air to liquid heat exchanger (110) and the cooling fluid source (150). The cooling fluid source (150) and the primary cooling coil (145) are fluidly connected by a cold input fluid conduit (230) and a warm return fluid conduit (235) which together form closed-circuit fluid flow path for circulating the cooling fluid between the cooling fluid source (150) and the primary cooling coil (145). A first fluid pump (240), which may include a cooling fluid reservoir, operates to circulate the liquid cooling fluid through the closed-circuit fluid flow path to deliver chilled cooling fluid from the cooling fluid source (150) to the primary cooling coil (145) through the cold input fluid conduit (230) and to return the cooling fluid from the primary cooling coil (145) to the cooling fluid source (150) through the warm return fluid conduit (235). A first control valve (245) is disposed along one of the fluid conduits of the liquid cooling circuit (225). The first control valve (245) is controlled by the electronic controller (205). The first control valve (245) can be actuated by the electronic controller (205) to fully open or fully closed to allow maximum or zero cooling fluid flow rates therethrough. The first control valve (245) can also be actuated to partially open and close e.g. to incrementally modulate a fluid flow rate of the cooling fluid between the maximum and the zero cooling fluid flow rates available. Operation of the first fluid pump (240) is preferably by the electronic controller (205). A pumping rate can be increased or decreased to increase or decrease a flow rate of the cooling fluid flowing through the liquid cooling circuit (225) by increasing or decreasing an operating parameter, e.g. pump van rotational velocity, or the like to change the fluid flow rate. Alternately the first fluid pump (240) operates at a constant fluid pumping rate.

A liquid heating circuit (250) includes the secondary heating coil (165) of the secondary air to liquid heat exchanger (115) and the heating fluid source (170). The heating fluid source (170) and the secondary heating coil (165) are fluidly connected by a hot input fluid conduit (255) and a cool return fluid conduit (260) which together form a closed-circuit fluid flow path for circulating the heating fluid between the heating source (170) and the secondary heating coil (165). A second fluid pump (265), which may include a heating fluid reservoir, operates to circulate the liquid heating fluid through the closed-circuit fluid flow path to deliver hot heating fluid from the heating fluid source (170) to the secondary heating coil (165) through the hot input fluid conduit (255) and to return the heating fluid from the secondary heating coil (165) to the secondary heating coil (165) through the cool return fluid conduit (260). A second control valve (270) is disposed along one of the fluid conduits of the liquid heating circuit (250) for manual or controlled operation by the electronic controller (205). The second control valve (270) is controlled by the electronic controller (205). The second control valve (270) can be actuated by the electronic controller (205) to fully open or fully closed to allow maximum or zero heating fluid flow rates therethrough. The second control valve (270) can also be actuated to partially open and close, e.g. to incrementally modulate a fluid flow rate of the heating fluid between the maximum and the zero heating fluid flow rates available. Operation of the first fluid pump (240) is preferably by the electronic controller (205). A pumping rate can be increased or decreased to increase or decrease a flow rate of the heating fluid flowing through the liquid heating circuit (250) by increasing or decreasing an operating parameter, e.g. pump van rotational velocity, or the like to change the fluid flow rate. Alternately the second fluid pump (270) operates at a constant fluid pumping rate.

In the non-limiting example embodiment of the climate control system (200), sensor locations include one or more temperature sensors (210) and one or more humidity sensors (215) disposed inside the indoor horticultural space to monitor air temperature and humidity levels therein at selected locations, e.g. proximate to the intake aperture (130) and the exit aperture (180). A temperature sensor (210) and a humidity sensor (215) are optionally located proximate to the primary air to liquid heat exchanger (110) for monitoring air temperature and humidity conditions corresponding with dehumidification. A temperature sensor (210) and a humidity sensor (215) are optionally located proximate to the secondary air to liquid heat exchanger (115) for monitoring air temperature and humidity corresponding with air heating. A fluid flow rate sensor (220) is optionally located inside the enclosure (125) in any one of the air flow chambers (140), (150), (175) to monitor an air flow rate through the enclosure (125). In either case the air flow rate through the enclosure (125) can be controlled by the electronic controller (205) by varying an air pressure and/or air velocity by modulating a controllable parameter or the air moving device (120), e.g. a rotational velocity of a fan blade, or the like to increase or decrease the volume flow rate of air through the (HCD) (100).

A temperature sensor (210) is located proximate to each of the cooling fluid source (150) and the heating fluid source (170) for monitoring a temperature of the liquid cooling fluid being provided by the cooling fluid source (150) and for monitoring a temperature of the liquid heating fluid being provided by the heating fluid source (170). A fluid flow rate sensor (220) is optionally disposed to monitor a fluid flow rate of the cooling fluid passing through the liquid cooling circuit (225) and a fluid flow rate sensor (220) is disposed to monitor fluid flow rate of the heating fluid passing through the liquid heating circuit (250). As noted above, the flow rate of the cooling fluid and the heating fluid can be independently controlled by the electronic controller (205) by varying a fluid pressure and/or fluid velocity by modulating a controllable pump parameter, e.g. a rotational velocity of a pump vane, in either the first fluid pump (240) or the second fluid pump (265). Alternately fluid flow rates can be varied by actuating corresponding first control valve (245) and the second control valve (270) to increase or decrease a flow aperture of the pump.

A first auxiliary fluid conduit (285) is disposed between the cool return conduit (250), of the liquid heating circuit (250), and the warm return conduit (235) of the liquid cooling circuit (225). A first three-way valve (275) is used to connect the first auxiliary fluid conduit (285) with the cool return conduit (260) of the liquid heating circuit (250). The first three-way valve (275) is operable by the electronic controller to independently open and close valve actuators corresponding with the first three-way valve to provide at least two different flow paths through the first three-way valve (275). The first flow path is along the cool return conduit (260) without allowing fluid to enter the cool return conduit (260) from the first auxiliary fluid conduit (285) and without allowing fluid to exit from the cold return conduit (260) to the first auxiliary fluid conduit (285). The first flow path is used when the liquid heating circuit (250) is only used to heat aft passing through the secondary air to liquid heat exchanger (115). A second flow path provided by operation of the first three-way valve (275) is to direct fluid from the cool return conduit (260) of the liquid heating circuit (250) through the first auxiliary fluid conduit (285) and into the warm return fluid (235) of the liquid cooling circuit (225) where the warm return fluid is pumped to the cooling fluid source (150) by the first fluid pump (240).

A second auxiliary fluid conduit (280) is disposed between the cold input fluid conduit (230), of the liquid cooling circuit (225), and the hot input conduit (255) of the liquid heating circuit (250). The second three-way valve (280) is used to connect the second auxiliary fluid conduit (290) with the cold input fluid conduit (230) of the liquid cooling circuit (225). The second three-way valve (280) is operable by the electronic controller to independently open and close valve actuators corresponding with the second three-way valve to provide at least two different flow paths through the second three-way valve (280). A third flow path is along the hot input conduit (255) without allowing fluid flow to enter the hot input conduit (255) from the second auxiliary fluid conduit (290) or to exit from the hot input conduit (255) to the second auxiliary fluid conduit (290). The third flow path is used when the liquid heating circuit (250) is only used to heat aft passing through the secondary air to liquid heat exchanger (115). A fourth flow path is provided by operation of the second three-way valve (280) is from the cold input fluid conduit (230) of the liquid cooling circuit (225) through the second auxiliary fluid conduit (290) and into the hot input conduit (255) of the liquid heating circuit (250).

Thus, according to an aspect of the present invention, the secondary heating coil (165) can be connected by the electronic controller (205) to either of the cooling fluid source (150) or the heating fluid source (170) by operation of the first three-way valve (275) and the second three-way valve (280). Since the secondary heating coil (165) controls the discharge temperature or exit temperature of air exiting from the HCD unit (100) to the indoor horticultural environment it is an aspect of the present invention that the secondary heating coil (165) is optionally used to heat the exit air using heating fluid received from the heating fluid source (170) or to cool the exit air using the cooling fluid received from the cooling fluid source (150). Thus, the secondary air to fluid heat exchanger (115) can be operated to heat or cool the air flow passing there through. Moreover, by controlling the flow rates in each of the auxiliary conduits (285) and (290) the climate control system (200) is operable to mix the heating and cooling fluids received from the respective heating and cooling sources (170) and (150) to finely adjust a temperature of the fluid being delivered to each of the primary cooling coil (145) and the secondary heating coil (165) without changes in either of the temperature of the cooling fluid received from the cooling fluid source (150) or the temperature of the heating fluid received from the heating fluid source (170).

The air moving device (120) pulls air from grow environment through all the heat exchanging processes and dehumidification and discharges the air with desired demand temperature and humidity back into the grow environment. As noted above, by varying the air velocity through the HCD unit (100) the air heating or cooling rate can be adjusted according to one or more desired exit air requirements.

The HCD (100) can be operated in four operating modes including, but not limited to, an air heating without dehumidification mode, an air cooling without dehumidification mode, an air heating with dehumidification mode, and an air cooling with dehumidification mode.

For the heating without dehumidification operation mode, there is no cooling fluid flow from the cooling fluid source (150) flowed through the primary cooling coil (145). Instead a heating fluid is delivered from the heating fluid source (170) to the secondary heating coil (165) to heat the air flow passing therethrough to a desired exit temperature. For this operation, the first valve (245) controlling the cooling fluid flow in the liquid cooling circuit (225) is closed to prevent cooling fluid flow to the primary cooling coil (145) and the second control valve (270) operated to control the heating fluid flow in the liquid heating circuit (250) is opened to allow heating fluid flow through the liquid heating circuit (250). Also, each of the first three-way valve (275) and the second three-way valve (280) is in an open position along the corresponding cool return conduit (260) and hot input conduit (255) which only allows the heated fluid to flow through the liquid heating circuit (250). Meanwhile each of the first three-way valve (275) and the second three-way valve (280) is in a closed position with respect to each of the first auxiliary conduit (285) and the second auxiliary conduit (290) to prevent fluid flow from the liquid heating circuit (250) to the liquid cooling circuit (225). For this operation mode, the desired temperature of the air exiting from the HCD (100) is maintained by modulating a flow rate of the heating fluid passing from the heating fluid source (170) to the secondary heating coil (165) by operation of the second control valve (270).

For the cooling without dehumidification operation mode, the temperature of the cooling liquid at the cooling fluid source (150) is maintained above the dew point temperature of the incoming air and supplied to the primary cooling coil (145) for cooling. For this operation, the valve (245) that controls cooling fluid flow into the primary cooling coil (145) is opened. Depending on the cooling requirement the valve (245) is modulated by the electronic controller (205), to control the flow rate of cooling fluid into the primary cooling coil (145) to provide a first cooling step wherein the intake air is first cooled by the primary cooling coil (145). If the output air temperature at the exit aperture (180) meets the desired air temperature using only the primary cooling coil (145) for cooling no further system configuration changes are required.

In cases where cooling only by the primary cooling coil (145) fails to provide enough cooling power, additional cooling capacity can by added by routing additional cooling fluid to the secondary coil (165). To add cooling fluid to the secondary coil (165), the first three-way valve (275) is opened by the electronic controller (205) to open the cool return conduit (260) to the first auxiliary conduit (285) while closing the portion of the cool return conduit (260) that extend between the first three-way valve (275) and the heating fluid source (170). The second three-way valve (280) is also opened by the electronic controller (205) to open the hot input conduit (255) to the second auxiliary conduit (290) while closing the portion of the hot input conduit (255) that extend between the second three-way valve (280) and the heating fluid source (170). In this configuration, cooling fluid is received from the liquid cooling circuit (225) into the liquid heating circuit (250) and delivered to the secondary heating coil (165). By flowing cooling fluid through the secondary heating coil (165) a second cooling step is provided wherein the exit air is further cooled by the secondary heating coil (165). For this operation mode, the desired exit air temperature is maintained by varying the cooling fluid flow rate in the primary cooling coil (145) by controlling the valve (245) and by varying the cooling fluid flow rate in the secondary heating coil (165) by controlling the second control valve (270).

For the heating with dehumidification operation mode, the temperature of the cooling liquid at the cooling fluid source (150) is maintained below the dew point temperature and is supplied to the primary cooling coil (145) for dehumidification. For this operation, the valve (245) controls the flow rate of liquid cooling fluid to the primary cooling coil (145). The second control valve (270) is opened and controls the rate of heating fluid to the secondary heating coil (165). Each of the first three-way valve (275) and the second three-way valve (280) is in the position which allows heated fluid to be received from the heating fluid source (170) and delivered into the secondary heating coil (165) with each of the first auxiliary conduit (285) and the second auxiliary conduit (290) being closed by one of the three-way valves (275) and (280).

In this operating mode, intake air entering the HCD unit (100) gets pre-cooled by the air to air heat exchanger (105) before entering the primary cooling coil (145). The temperature of the cooling fluid is below the dew point temperature. As the air flows through the primary cooling coil (145) the moisture in the incoming air is condensed to liquid droplets. If the humidity at the exit aperture (180) meets the desired humidity requirements no changes are made. If humidity at the exit aperture (180) does meet the desired humidity requirements the cooling fluid flow rate can be increased to decreased to alter the air-cooling rate in the primary air to liquid heat exchanger, or the temperature of the cooling fluid can be increased or decreased to meet the desired humidity requirements.

In a first heating step, the air flow passing through the second air path (B) is heated by the air flow entering the HCD unit (100) through the first air path (A). In a second heating step the air flow enters the secondary air to liquid heat exchanger (115) and is heated by the secondary heating coil (165) prior to discharge back into the grow environment. For this operation mode, the humidity level in the grow environment is controlled by controlling the flow rate of the cooling fluid through the valve (245) to the primary cooling coil (145) with the cooling fluid temperature being maintained below the dew point temperature of the intake air. The temperature of the exit air is controlled by controlling the flow rate of the heating fluid through the second control valve (270) to the secondary heating coil (165) through the second control valve (270) to the secondary heating coil (165).

There are two operation conditions for the cooling with dehumidification operation mode, one is low cooling load with dehumidification and the other operation is high cooling load with dehumidification.

For the low cooling load with dehumidification operation mode, the cooling fluid is maintained below the dew point temperature and supplied to the primary cooling coil (145) for dehumidification. For this operation, the first valve (245) controls the flow of cooling fluid to the primary cooling coil (145). For the low cooling load requirement, the secondary coil (165) is not used for cooling so the second control valve (270) for controlling fluid flow into the secondary heating coil (165) is closed. The intake air entering the HCD unit (100) gets pre-cooled by the air to air heat exchanger (105) before entering the primary cooling coil (145). As the high humidity air flows through the low temperature of the primary cooling coil (145) the moisture gets condensed and drops out of the air stream. The air then gets heated up by exchanging heat with the warm return air in the first air flow path (A), while passing through the air to air heat exchanger (105). Since there is no liquid flow into the secondary coil the air temperature is unchanged after flowing through the air to air heat exchanger (105) and exits through the exit aperture (180) at the desired discharge temperature to the grow environment. For this operation mode, the humidity level in the grow environment is controlled by the valve (245) by controlling flow rate of the cooling fluid to the primary cooling coil (145).

For high cooling requirement with dehumidification operation mode, the cooling fluid is maintained below the dew point temperature and supplied to the primary cooling coil (145) for dehumidification. For this operation, the valve (245) controls the flow rate of the cooling fluid to the primary cooling coil (145). For the high cooling load requirement, the secondary heating coil (165) is also used as a cooling cool to increase the overall cooling capacity. The second control valve (270) controls the flow rate of liquid cooling fluid into the secondary heating coil (165). The first three-way valve (275) and the second three-way valve (280) are configured to allow cooling liquid to be circulated from the cooling fluid source (150) to secondary heating coil (165) through the first auxiliary conduit (285) and the second auxiliary (290) to further increase the cooling capacity.

The intake air entering the HCD unit (100) gets pre-cooled by the air to air heat exchanger (105) before entering the primary cooling coil (145). As the high humidity air flows through the below dew point temperature of the primary cooling coil (145) the moisture in the air gets condensed and drops out of the air stream. The air then gets heated as it passes through the second flow path (B) by exchanging thermal energy with the intake air flowing through the first flow path (A) of the air to air heat exchanger (105). After exiting the second flow path (B), the air enters the secondary air to liquid heat exchanger (115) to be further cooled to the desired exit temperature by the secondary coil (165) before discharged back into the grow environment through the exit aperture (180). For this operation mode, the humidity level in the grow environment is controlled by the valve (245) which controls the cooling fluid flow rate to the primary cooling coil (145), and the desired exit air temperature is controlled by the second control valve (270) which controls the cooling fluid flow rate to the secondary heating coil (165).

Figure 3:
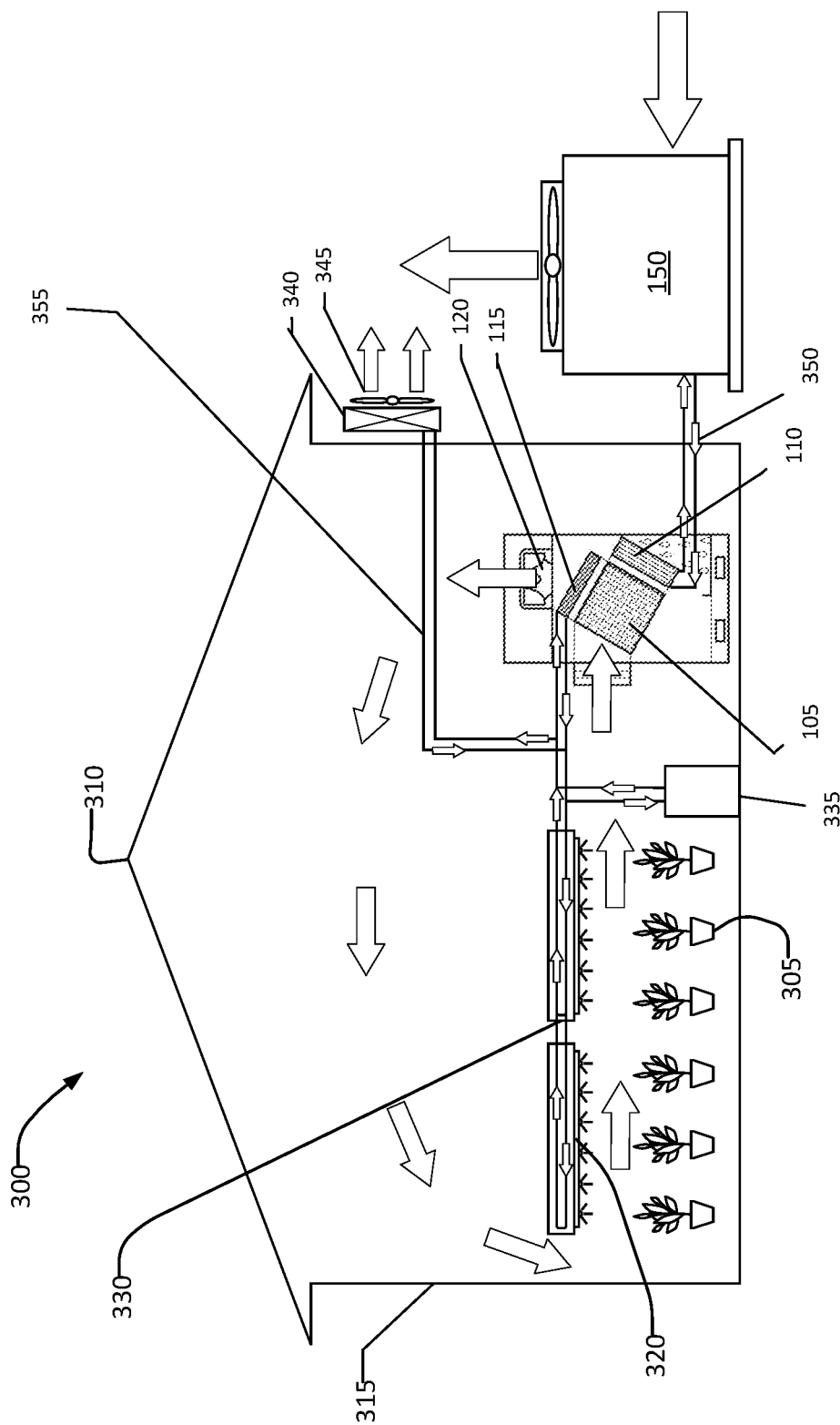
FIG. 3 depicts an exemplary non-limited schematic diagram showing an indoor horticultural environment that includes artificial lighting with liquid cooling interfaced with the improved heating, cooling, and dehumidification device and a fluid distribution and control system according to an aspect of the present invention.

FIG. 3 depicts a non-limiting exemplary schematic diagram of an indoor horticulture environment (300) according to an embodiment of the present invention. The indoor horticultural environment (300) includes various horticultural products (305) supported in a manner suitable for cultivation. The various horticultural products (305) are installed inside a structure that at least includes a roof (310) and side walls (315) that provide a substantially closed indoor horticultural environment. In one non-limiting example embodiment the various horticultural products (305) are horizontally disposed over a two-dimensional area. In the present example, the horticultural products (305) are exclusively illuminated by a lighting assembly (320) disposed above the two-dimensional horizontal horticultural products support area.

The lighting assembly (320) comprises a plurality of individual emitters each operating to illuminate the horticultural products (305). The lighting assembly (320) is cooled by a lighting cooling module (325) configured to maintain the individual light emitters at a safe operating temperature capture and to capture waste heat from the individual light emitters. The lighting cooling module (325) includes a plurality of liquid conduits each comprising a thermally conductive metal wall formed with copper or aluminum. The liquid conduit metal walls are thermally conductively coupled with each individual light emitter, e.g. LED lamps, or the like. The liquid conduits provide a thermally conductive path that extends from each illumination emitter to the cooling liquid flowing through the liquid conduits. According to an aspect of the presentation the plurality of liquid conduits is fluidly coupled together to form a liquid cooling circuit (330). An example of the lighting assembly (320) and the liquid cooling circuit (330) is described in related U.S. Pat. No. 9,857,086B2 entitled LED Lighting System and Operating Method for Irradiation of Plants by Nguyen et al.

The indoor horticulture environment (300) includes a climate control system based on the heating, cooling and dehumidifying (HCD) unit (100) described above. In the present example a heating cooling and dehumidifying (HDC) unit is installed inside the horticultural environment (300). The HDC unit includes an air to air cross-flow heat exchanger (105), a primary air to liquid heat exchanger (110), a secondary air to liquid heat exchanger (115), and an air moving device (120), all described above.

Air from the horticultural environment is drawn into the first air flow chamber (A) of the cross-flow air to air heat exchanger (105) by operating the air moving device (120). The air flow circulates from the first air flow chamber (A) through the primary air to liquid heat exchanger (110) and then passes back through the second air flow chamber (B) of the cross-flow air to air heat exchanger (105) and then continues through the secondary air to liquid heat exchanger (115) before returning to the horticultural environment through an exit aperture.

A cooling fluid source (150) such as a conventional liquid chiller is provided outside the horticultural environment. The chiller delivers the cooling fluid at a temperature that is below the dew point such between 40 and 60° F. A liquid cooling circuit (350) circulates the cooling fluid received from the cooling fluid source (150) through the liquid cooling circuit (350) and the flow rate of the cooling fluid is controllable by a control valve as described above. Thus, the primary air to liquid heat exchanger (110) is operated to dehumidify the air flow passing there through by cooling the air flow below the dew point temperature using the liquid cooling fluid provided by the liquid cooling source (150).

A combination of elements and operating modes is used to provide a heating fluid source. In a first mode, the secondary air to liquid heat exchanger (115) is fluidly interfaced with the lighting assembly cooling circuit (330). In this operating mode the lighting cooling fluid that is flowing through the lighting assemble cooling circuit (330) is directed to flow through the secondary air to liquid heat exchanger (210) be opening and closing one or more flow valves to provide the desired fluid flow path. In this embodiment, the lighting assembly cooling fluid enters the secondary air to liquid heat exchanger (115) at a temperature that is above the desired exit air temperature of the HCD unit. While desired exit air temperature of the HCD unit may vary according to the climate control schema, e.g. between day and night, or for different horticultural products the range is likely to remain between about 60 to 84° F. or about 15.5 to 28.9° C. Accordingly, when the temperature of the cooling fluid that is flowing through the lighting assemble cooling circuit (330) is above about 100° F. or 37.8° C. the lighting cooling fluid is usable as a heating fluid source for the secondary air to liquid heat exchanger (115).

When the cooling fluid that is flowing through the lighting assemble cooling circuit (330) is not usable as a heating fluid by the secondary air to liquid heat exchanger (120) an auxiliary heating fluid source (335) is used. In a non-limiting example embodiment, the auxiliary heating fluid source (335) comprises a conventional water or liquid fluid heater that maintains a heating fluid at a predetermined temperature for use on demand. In the example the auxiliary heating fluid source (335) is fluidly connected to the secondary air to liquid heat exchanger (115) by operating one or more valves, e.g. three-way valves as described above. In this operating mode, the secondary air to liquid heat exchanger (115) is fluidly decoupled from the lighting assembly cooling circuit (330) in favor of the receiving the heating fluid source from the auxiliary heating fluid source (335).

As is further shown in the indoor horticulture environment (300) an auxiliary air to liquid heat exchanger (340) which includes an air moving device (345) is disposed outside the horticultural environment. As is further shown, an auxiliary fluid flow circuit (355) is fluidly coupled between the lighting assembly cooling circuit (330) and the auxiliary air to liquid heat exchanger (340) to provide an auxiliary cooling path for the cooling fluid that is flowing through the lighting assemble cooling circuit (330) to be cooled when the secondary air to liquid heat exchanger (115) is not available or not suitable for cooling the cooling fluid that is flowing through the lighting assemble cooling circuit (330).

In this embodiment, the auxiliary fluid flow circuit (355) is connected with the lighting assembly cooling circuit to either add the auxiliary air to liquid heat exchanger (340) in series or in parallel with the secondary air to liquid heat exchanger (115) or to alternately connect the auxiliary air to liquid heat exchanger (340) or the secondary aft to liquid heat exchanger (115) to the lighting assemble cooling circuit (330) to cool the cooling fluid that is flow ing through the lighting assemble cooling circuit (330).

In a preferred embodiment of the present invention, the exit air temperature from the HDC unit (100) is between 78 and 84° F. and the desired humidity is in a range of 40 and 60%. In other operating modes, e.g. at night, the exit air temperature from the HDC unit (100) may be as low as about 60° F. but not less than 55° F. This the overall exit temperature range is between about 60 and 84° F. or 15.5 to 28.9° C. A desired operating temperature of the lighting assembly (325) is not to exceed 140° F. or 60° C. and a preferred steady state operating temperature of the lighting assembly (325) is about 125° F. or 51.7° C.

It will also be recognized by those skilled in the art that, while the invention has been described above in terms of preferred embodiments, it is not limited thereto. Various features and aspects of the above described invention may be used individually or jointly. Further, although the invention has been described in the context of its implementation in a particular environment, and for particular applications (e.g. an indoor horticultural environment), those skilled in the art will recognize that its usefulness is not limited thereto and that the present invention can be beneficially utilized in any number of environments and implementations where it is desirable to provide climate control with reduced energy consumption. Accordingly, the claims set forth below should be construed in view of the full breadth and spirit of the invention as disclosed herein.

What is claimed:

1. A air heating cooling and dehumidification device for maintaining air contained within an enclosed horticultural environment at a desired humidity and air temperature comprising:
    an air to air cross flow heat exchanger formed with a first air flow path (A) for receiving air flow from the enclosed horticultural environment;
    a primary air to liquid heat exchanger comprising a primary cooling coil in fluid communication with a liquid cooling fluid source, wherein the air flow is directed from the first air flow path (A) through the primary air to liquid heat exchanger;
    a second air flow path (B) formed by the air to air cross flow heat exchanger wherein the air flow passing through the first flow path (A) and the air flow passing through the second flow path (B) are not mixed while thermal energy is exchanged between the air flow passing through the first flow path (A) and the air flow passing through the second flow path (B) and wherein the air flow exiting from the primary air to liquid heat exchanger is directed through the second air flow path (B);
    a secondary air to liquid heat exchanger comprising a secondary heating coil in fluid communication with a liquid heating fluid source, wherein the air flow exiting from the second flow path (B) is directed through the secondary air to liquid heat exchanger; and
    a liquid cooling circuit formed as a closed circuit flow path that includes an input fluid conduit, a return fluid conduit, the primary cooling coil and the liquid cooling fluid source, a first fluid pump, a first control valve and a first fluid flow rate sensor disposed along the closed circuit flow path, wherein an electronic controller comprising a data processor operating a climate control schema, is interfaced with each of the first fluid pump, the first fluid control valve, and the first flow rate sensor and the energy management schema operates the first pump and the first fluid control valve to circulate a cooling fluid through the liquid cooling circuit at one or more fluid flow rates ranging between a maximum flow rate and a zero flow rate.

2. The air heating cooling and dehumidification device of claim 1, further comprising a first temperature sensor and a first humidity sensor, each interfaced with the electronic controller and each located proximate to the primary air to liquid heat exchanger to measure temperature and humidity of dehumidified air, wherein the energy management schema modulates the fluid flow rate to achieve a desired humidity of the dehumidified air.

3. The air heating cooling and dehumidification device of claim 1, further comprising a housing, wherein the housing comprises:
   a first air flow chamber formed to direct the air flow from an exit of the first air flow path (A) to an entrance of the primary air to liquid heat exchanger;
   a second air flow chamber formed to direct the air flow from an exit of the primary air to liquid heat exchanger to an entrance of the second air flow path (B);
   a third air flow chamber formed to direct the air flow from an exit of the second air flow path (B) to an entrance to the secondary air to liquid heat exchanger;
   a fourth air flow path formed to direct the air flow from an exit of the secondary air to liquid heat exchanger to an exit aperture.

4. The air heating cooling and dehumidification device of claim 3 further comprising an air moving device supported in the fourth air flow path between the exit of the secondary air to liquid heat exchanger and the exit aperture.

5. The air heating cooling and dehumidification device of claim 1 wherein the liquid heating fluid source comprises a combination of a lighting assembly cooling circuit and an auxiliary heating fluid source each coupled to the liquid heating coil by one or more auxiliary fluid flow conduits.

6. The air heating cooling and dehumidification device of claim 1 further comprising a lighting assembly comprising a plurality of LED lamps provided to illuminate horticultural products inside the horticulture environment, a lighting assembly cooling module coupled to the lighting assembly comprising a plurality of liquid conduits formed with a material having a coefficient of thermal conductivity of 100 Wm/K or greater, wherein each LED lamp is thermally conductively coupled with one of the plurality of liquid conduits of the lighting assembly cooling module and wherein the lighting assembly cooling module comprises the liquid heating fluid source.

7. The air heating cooling and dehumidification device of claim 1, wherein the primary air to liquid heat exchanger does not include an evaporator.

8. The air heating cooling and dehumidification device of claim 1 wherein the secondary air to liquid heat exchanger does not include a condenser.

9. The air heating cooling and dehumidification device of claim 1 wherein the liquid heating fluid source is not a condenser.

10. The air heating cooling and dehumidification device of claim 1 wherein the first flow path and the second flow path are separated by a thermally conductive wall formed from a material having a coefficient of thermal conductivity of 100 Wm/K or greater.

11. The air heating cooling and dehumidification device of claim 1, wherein the first flow path and the second flow path are substantially orthogonal.

12. The air heating cooling and dehumidification device of claim 1, wherein the liquid cooling fluid source comprises a liquid chiller disposed outside the enclosed horticultural environment.

13. A air heating cooling and dehumidification device for maintaining air contained within an enclosed horticultural environment at a desired humidity and air temperature comprising:
   an air to air cross flow heat exchanger formed with a first air flow path (A) for receiving air flow from the enclosed horticultural environment;
   a primary air to liquid heat exchanger comprising a primary cooling coil in fluid communication with a liquid cooling fluid source, wherein the air flow is directed from the first air flow path (A) through the primary air to liquid heat exchanger;
   a second air flow path (B) formed by the air to air cross flow heat exchanger wherein the air flow passing through the first flow path (A) and the air flow passing through the second flow path (B) are not mixed while thermal energy is exchanged between the air flow passing through the first flow path (A) and the air flow passing through the second flow path (B) and wherein the air flow exiting from the primary air to liquid heat exchanger is directed through the second air flow path (B);
   a secondary air to liquid heat exchanger comprising a secondary heating coil in fluid communication with a liquid heating fluid source, wherein the air flow exiting from the second flow path (B) is directed through the secondary air to liquid heat exchanger; and
   a liquid heating circuit formed as a closed circuit flow path that includes an input fluid conduit, a return fluid conduit, the secondary cooling coil and the heating fluid source, a second fluid pump, a second control valve and a second fluid flow rate sensor disposed along the closed circuit flow path, wherein an electronic controller comprising a data processor operating a climate control schema, is interfaced with each of the second fluid pump, the second fluid control valve, and the second flow rate sensor and the energy management schema operates the second pump and the second fluid control valve to circulate a heating fluid through the liquid heating circuit at one or more fluid flow rates ranging between a maximum flow rate and a zero flow rate.

14. The heating cooling and dehumidification device of claim 13 further comprising an auxiliary heating fluid source coupled to the liquid heating circuit by auxiliary liquid conduits arranged as a flow loop that includes a third control valve interfaced with the electronic controller wherein the auxiliary fluid source includes a heating liquid device operated to maintain the liquid heating fluid at the desired temperature or higher wherein the third control valve is operated by the energy management schema to modulate a fluid flow rate through the auxiliary conduits between a zero flow rated and a maximum rate.

15. The air heating cooling and dehumidification device of claim 13 further comprising an auxiliary air to liquid heat exchanger and a corresponding air moving device interfaced with the electronic controller disposed outside the horticultural environment wherein the auxiliary air to liquid heat exchanger is fluidly coupled to the liquid heating circuit by auxiliary liquid conduits arranged as a flow loop that includes a fourth control valve interfaced with the electronic controller wherein the fourth control valve is actuated by the energy management schema to fluidly connect the auxiliary air to liquid heat exchanger with the liquid heating circuit and to modulate a fluid flow rate between the auxiliary air to liquid heat exchanger and the liquid heating circuit between a zero flow rate and a maximum flow rate.

16. The air heating cooling and dehumidification device of claim 13, further comprising a second temperature sensor and a second humidity sensor located proximate to the secondary air to liquid heat exchanger to measure dehumidified air temperature and humidity, wherein the energy management schema modulates the fluid flow rate through the liquid heating circuit to achieve a desired air temperature.

17. An air heating cooling and dehumidification system, comprising:
- a liquid cooling circuit formed as a first closed circuit flow path that includes an input fluid conduit, a return fluid conduit, a primary cooling coil, a cooling fluid source, a first fluid pump, a first control valve, and a first fluid flow rate sensor disposed along the first closed circuit flow path;
- a liquid heating circuit formed as a second closed circuit flow path that includes an input fluid conduit, a return fluid conduit, a secondary heating coil, a heating fluid source, a second fluid pump, a second control valve and a second fluid flow rate sensor disposed along the second closed circuit flow path;
- first and second auxiliary fluid conduits each including an auxiliary fluid control valve connected between the liquid cooling circuit and the liquid heating circuit;
- an electronic controller comprising a data processor operating a climate control schema interfaced with each of the first and second fluid pump, the first and second fluid control valve, the first and second flow rate sensor and the auxiliary fluid control valve;
- wherein the energy management schema independently operates the first pump and the first fluid control valve to circulate a cooling fluid through the liquid cooling circuit at one or more fluid flow rates and independently operates the second pump and the second fluid control valve to circulate a heating fluid through the liquid heating circuit at one or more fluid flow rates;
- an air to air cross flow heat exchanger formed with a first air flow path (A) for receiving air flow from the enclosed horticultural environment and directing the air flow over the primary cooling coil and formed with a second air flow path (B) formed by the air to air cross flow heat exchanger for receiving air flow that has passed over the primary cooling coil and directing air flow exiting from the second air flow path over the second heating coil.

18. The air heating cooling and dehumidification device of claim 17, wherein the climate control schema; actuates the auxiliary control valve to mix the heating fluid and the cooling fluid in one or both of the primary cooling coil and the secondary heating coil and receives signals from a plurality of sensors positioned to monitor temperature, humidity and fluid flow rates at selected locations of the heating cooling and dehumidification system and of the horticultural environment.

* * * * *